United States Patent [19]
Joyner

[11] 4,389,926
[45] Jun. 28, 1983

[54] STOCK/SAUCE SEPARATOR
[76] Inventor: Auvin H. Joyner, 43-39 39th Pl., Apt. 43, Sunnyside, N.Y. 11104
[21] Appl. No.: 273,433
[22] Filed: Jun. 15, 1981
[51] Int. Cl.³ .............................................. A47J 43/28
[52] U.S. Cl. ........................................ 99/495; 99/444; 141/331; 141/375; 210/249; 210/514; 251/339
[58] Field of Search ........................... 99/444, 495–497; 210/249, 513–519; 251/319, 339, 357; 222/510, 559; 141/331, 375; 248/346, 310

[56] References Cited
U.S. PATENT DOCUMENTS

| 1,758,219 | 5/1930 | Clarke et al. | 251/339 |
| 2,315,948 | 4/1943 | Esnard | 251/357 |
| 2,381,319 | 8/1945 | Swift | 222/510 |
| 3,583,664 | 6/1971 | Kalina | 248/346.1 |
| 3,865,023 | 2/1975 | Halvorsen | 99/444 X |

Primary Examiner—Philip R. Coe
Assistant Examiner—Timothy F. Simone
Attorney, Agent, or Firm—Richard L. Miller

[57] ABSTRACT

A cooking utensil for separating liquid gravy from fats and oil is provided, which utensil has a receptacle in which is placed the mixture of gravy with fats and oil. The bottom of the receptacle has an elongated tubular opening in which a valve is positioned. The liquid gravy is removed from the mixture by gravity through the tubular opening, and the rate of outflow is controlled by a valve. The valve has a flexible closure element which when positioned within the cylindrical portion of the opening closes off the flow of liquid, and when positioned in the truncated conically-shaped outlet of the tubular opening controls the rate of outflow.

13 Claims, 5 Drawing Figures

STOCK/SAUCE SEPARATOR

BACKGROUND OF THE INVENTION

The present invention is directed to a cooking utensil, and specifically to a device for separating liquid gravy from fats and oils.

During the preparation of gravy and stock, as from beef or chicken, it is necessary to separate the liquid portion of a mixture of gravy with fats and oils, so that the liquid may be subsequently used as gravy in the well-known manner. After the liquid gravy is separated out, the remaining fats and oils may be used to prepare stock, which is further used in the preparation of many dishes by cooking food in it.

It has hitherto been the case that the liquid gravy has been separated from the fats and oils in the mixture by manual procedure, such as the use of a ladel. This, obviously, is time-consuming and messy, as well as being inefficient, in that much of the fats and oil end up included in the gravy.

SUMMARY OF THE INVENTION

It is the primary object of the present invention to provide a method and device for automatically removing the liquid gravy portion from a mixture of gravy with oils and fats suspended therein.

It is another object of the present invention to achieve such separation in a fast and easy manner, with little effort needed to achieve such an end.

It is another object of the present invention to provide such a device that is not messy during use and which may be stored for ready availability.

It is another object of the present invention to provide such a device which will allow for the rate of separation of the liquid from the fats and oils at constant or a controlled variable rate.

It is still another object of the present invention to provide such a device in an inexpensive and easy-to-fabricate manner, and which device is stylish as well as functional.

To these ends, the present invention has a receptacle, shaped as a ewer or cup, in which is placed the mixture of liquid gravy with oils and fats. When the mixture is allowed to settle, the fats and oils will float upon the surface of the liquid, which liquid constitutes that portion of the mixture subsequently used for gravy to supplement and enrich cooked dishes.

The ewer or cup member has an elongated opening at its bottom, through which the liquid is caused to flow and exit into a container for storing the gravy, or directly onto a cooked dish for such enrichment. The rate of outflow of the liquid from the outlet is controlled by a valve, which valve is made up of a flexible closure element movable within the elongated outlet opening. Since the bottom of the outlet opening is tapered outwardly to form a truncated conically-shaped outlet, when the closure element is pushed downwardly by a shaft attached to the element, so that the closure element is not large to close off the outlet opening, the liquid will exit. By varying the location of the closure element within the conically-shaped outlet opening, the rate of flow of liquid may be controlled. To stop the outflow, the closure element is pulled upwardly by the shaft so that the closure element will be slightly compressed within the main cylindrical portion of the elongated opening, which portion has a slightly less diametrical measurement than that of the closure element.

A saucer is also provided in combination with the ewer and valve means, which saucer is designed to support the ewer thereon when the device is not in use. The saucer has an upstanding circular rib which projects into the outlet opening to assure that the closure element is constrained within the cylindrical portion of the opening, and therefore stop flow of the liquid.

BRIEF DESCRIPTION OF THE DRAWING FIGURES

The description will be more readily understood with reference to the accompanying drawing, wherein FIG. 1 is a perspective view of the stock-sauce separator cooking utensil of the present invention;

DETAILED DESCRIPTION OF THE PREFERRED EMBODIMENT

Figure 1:
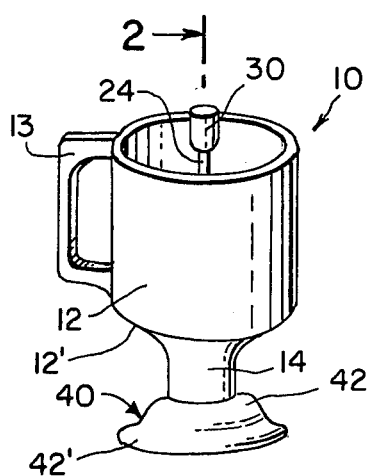

Referring now to the drawing, the stock-sauce separator cooking utensil of the present invention is generally indicated by reference numeral 10. The separator 10, as mentioned above, is used to separate the liquid from oil and fat, such as is needed when making gravy from meat or turkey. In such cases, the oil and fat will settle to the top of the liquid, such liquid being subsequently used for gravy and the oil and fat being subsequently used for stock.

The separator utensil 10 has a main body portion or ewer 12 of glass, having a substantially cylindrical shape in which is provided the mixture of liquid with oil and fat to be separated. A handle 13 for gripping and holding is attached to a surface of the receptacle 12, such handle preferably being integrally molded with the receptacle 12. The bottom of the main body portion 12 is shaped as a funnel and has an inwardly and downwardly tapering shoulder 12' terminating in an elongated axial aligned hollow tube 14. The tube 14, of circular cross-section, is also preferably formed integral with the rest of main body portion and has an outlet end indicated by reference numeral 14'. The outlet end 14' is so formed as to taper outwardly to give a truncated conical shape to an outlet opening which terminates the cylindrical opening 16 formed by the interior of the hollow tube.

Figure 3:
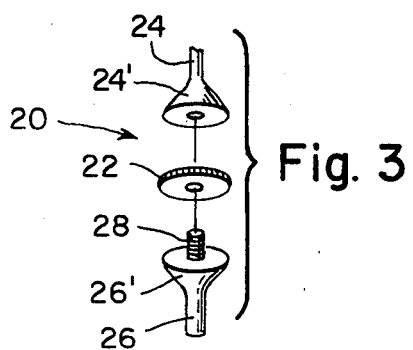
FIG. 3 is an exploded view of the assembly of the valve unit of the present invention used to control the liquid outflow from the device.

In order to control the rate of outflow of the liquid portion from the receptacle, a valve is provided, which is generally indicated by reference numeral 20. The valve 20 has a soft disc-shaped closure element 22 which has an outer diameter only slightly greater than the diameter of the circular opening 16, to thereby provide a snug, liquid-tight fit therebetween. The closure element 22 is affixed to a shaft 24, preferably made of a hardened metal, which shaft 24 terminates at one end in an enlarged, conically-shaped knob 24'. The knob 24' is provided with a central bore (FIG. 3) which is axially aligned with a central hole formed in the closure element 22. The closure element 22 is fastened to the knob 24', and therefore the shaft 24, by another metal shaft 26 also terminating in an enlarged, conically-shaped knob 26'. A screw 28, projecting from the flat surface of the cone-shaped knob 26, is received through the central hole of the closure element 22 and screwed in the threaded bore of the knob 24', to thereby affix the closure element of the shaft. While the closure element 22 is positioned within the cylindrical opening 16, the shaft is held stationary and upright thereby due to the friction between the closure element and the interior surface of the tube 14. When the closure element is thus positioned in the portion of the opening that is cylindrical in shape, no outflow of the liquid contained in the receptacle is allowed. However, upon downward movement of the shaft 24 via insulator handle 30, the closure element 22 will eventually reach the junction or area of the outlet opening that is of truncated-conical shape, so that the liquid will then be allowed to flow around the circumference of the closure element 22 and along the tapered interior surface of the tube. The more the closure element is pushed downwardly along the conical outlet opening, the greater will be the flow of liquid therethrough, and vice versa. Upward movement to reposition the closure element within the cylindrical opening 16 will again shut off flow.

Figure 4:
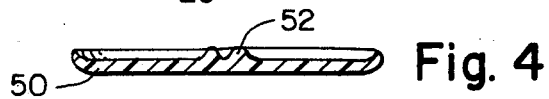
FIG. 4 is a cross-sectional end view of a saucer used in conjunction with the present invention.
Figure 2:
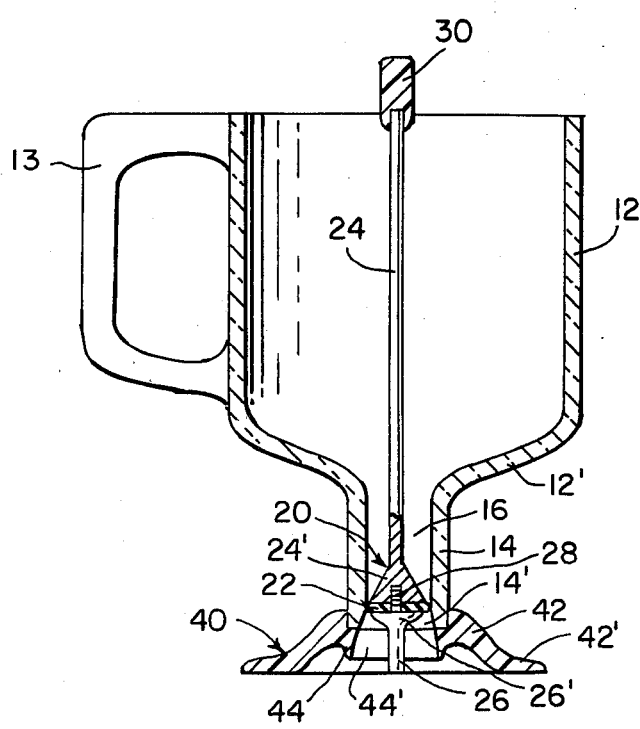
FIG. 2 is a cross-sectional view of the present invention taken along line 2—2 of FIG. 1.

In the preferred form of the invention, there is also provided a support for the separator device, which support is generally indicated by reference numeral 40. The support 40 is provided to allow storage of the device when not being used and to provide a support for the device when the liquid is being removed from the receptacle. The support 40 is made of a hard plastic, in the embodiment shown in FIG. 2, and typically has a dome-shaped portion 42 of circular cross-section, in which is provided a top aperture for receiving the end 14' of the tube 14, as shown in FIG. 2. The dome-shaped portion 42 terminates in an outwardly curved peripheral flange 42', which flange is used to support the device on the saucer 50 (FIG. 4) or other support. Interiorly of the dome-shaped portion, there is provided a circular bead 44, which circular bead extends inwardly from the outer edges of the dome-shaped portion. The bead 44 defines therein a truncated conically-shaped passageway 44', which taper is equal to the taper of the side walls of the tube 14 forming the outlet opening 14'. Thus, the passageway 44' forms an extension of the opening 16 and the outlet opening 14' thereof. The circular bead 44 projects inwardly to cover off a portion of the aperture formed in the dome-shaped portion 50 so that the end surfaces of the tube 14 rest thereon. A suitable bonding technique may be used to adhere the end of tube 14 to the dome-shaped portion 42 and bead 44. In this preferred form of the invention, the separator device 10, including the receptacle 12, the tube 14, and the handle 13, is made of a heat-resistant glass, such as Pyrex. The pitcher, or receptacle, 12 typically has a two-cup capacity.

The support 40 is preferably made of a clear plastic, so that visual observation may be made of the rate of outflow of the liquid through the outlet opening, and also to gauge at which point the separating plane between the liquid and oil/fat is below the inwardly tapering portion 12' of the receptacle. This will allow a user to pull up on the handle 30 of the shaft 24 at that point where the fats and oil are about to exit from the outlet opening. It is also noted that the handle portion 30 of the shaft 24 is made of an insulating material to protect from the hot liquid inside. The handle portion 30 extends upwardly beyond the uppermost inlet plane of the receptacle 12, preferably at all times to allow easy access and use.

In use, the support 40 for the device is placed on any suitable storage vessel, or the like, for the liquid, with the flange 42' resting thereon. Afterwards, the shaft 24 is lowered by handle 30, to release the liquid contents of the receptacle through the opening 16 and the outlet opening 44' to the container, or the like, below. When the device is not in use, or it is desired to rest the support on another surface, saucer 50 may be used. The saucer 50 (FIG. 4) is provided with a special circular and upstanding rib 52, to define a recess in which is received the tip end or foot means of the shaft 26. The height of rib 52 is such that it contacts the tip end or foot means of the shaft 26 while the closure element 22 is positioned within the cylindrical opening of the tube, so that the flow of liquid is stopped. The saucer 50 typically has a diameter approximately equal to the outer diameter of the flange 42'.

Figure 5:
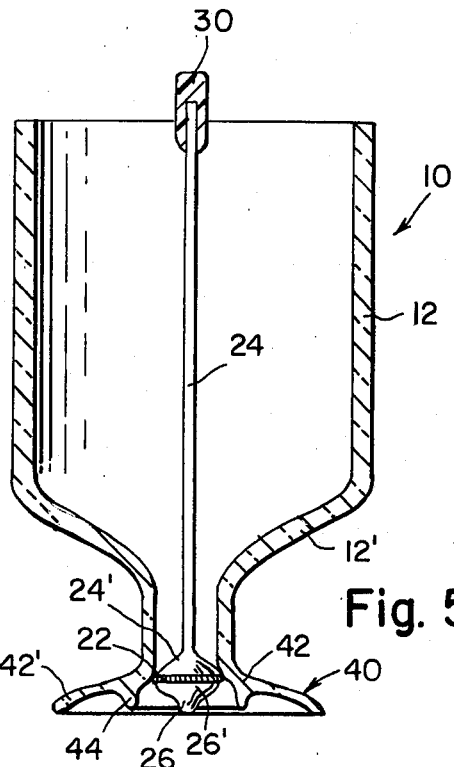
FIG. 5 is an elevational view, partly in cross-section, of a modified form of the invention where the entire device is made of one integrally molded material.

In a modified form of the invention shown in FIG. 5, the receptacle 12 and the support 40 are formed as one integral whole and made of heat-resistant glass. Alternatively, the entire unit may be made of a hard clear plastic, again molded integrally in one piece.

While a specific embodiment of the invention has been shown and described, it is to be understood that numerous changes and modifications thereof may be made without departing from the scope and spirit of the invention as limited in the appended claims.

What is claimed is:

1. A cooking utensil for separating oil and fats from liquids comprising: a storage vessel for storing therein a liquid which is to be separated from oil and fat at the top of the liquid, said storage vessel comprising a main body portion, and a secondary portion extending from said main body portion having an opening formed therein through which the liquid is removed from said main body portion; and valve means positioned within said secondary portion for controlling the outflow of the liquid through said second portion, said valve means comprising a shaft reciprocally movable within said secondary portion, a flexible element affixed to said shaft for movement therewith, said flexible element being movable along at least a portion of the length of said opening formed in said secondary portion to control the outflow of the liquid therethrough, and means for attaching said flexible element to said shaft; said opening having a first elongated straight portion extending from said main body portion, and a second portion extending from the end of said first portion not connected to said main body portion, said second portion being outwardly tapering in a direction away from said first portion along the length thereof, said flexible element having a diametrical cross-sectional area approximately equal to the diametrical cross sectional area defined within said first portion of said opening, to thereby restrict positioning of said flexible element to the junction between said first and second portions or within said second portion, whereby when said flexible element is positioned at said junction the liquid within said storage vessel is prevented from flowing through said opening, and when said flexible element is positioned within said second portion of said opening the liquid is allowed to flow outwardly therethrough, support means extending from said secondary portion for supporting said storage vessel onto a support surface, and foot means depending from said flexible element and extending through said support means, the length of said foot means being such as to just reach the bottom of said support means when said flexible element is positioned at said junction, whereby when said storage vessel is placed on a support surface said flexible element is retained at said junction.

2. The cooking utensil according to claim 1, wherein said secondary portion comprises a first end connected to the bottom of said main body portion, and a second end remote from said first end and spaced from said first end; said opening having a circular cross-section, and said flexible element comprises a disc made of soft compressible material for a snug liquid tight fit at said junction.

3. The cooking utensil according to claim 2, wherein said shaft comprises a first end affixed to said flexible element, and a second end remote and spaced from said first end, said shaft extending from adjacent said bottom of said main body portion toward the upper end of said main body portion, said second end of said shaft having handle means thereon for gripping said shaft to thereby reciprocate it within said main body portion and within said secondary portion.

4. The cooking utensil according to claim 3, wherein said first end of said shaft comprises a first enlarged knob, said enlarged knob having a central threaded hole formed therein; and said means for mounting said flexible element to said shaft comprises a second enlarged knob having a screw extending from a surface thereof, said screw passing through said flexible element and being received in said central threaded hole for affixing said flexible element to said first end of said shaft, said foot means integrally depending from said second enlarged knob.

5. The cooking utensil according to claim 3, wherein said shaft is made of metal, and said handle means is made of an insulating material; said handle means projecting upwardly beyond the uppermost part of said main body portion when said shaft is in its uppermost flow-stopping position; said main body portion further comprising a handle connected to an area thereof.

6. The cooking utensil according to claim 2, wherein said support means comprises a central passageway in communication with said opening of said secondary portion.

7. The cooking utensil according to claim 6, wherein said central passageway is of circular cross-section and tapers outwardly and downwardly from its first end, said first end of said central passageway being connected to said second portion of said opening, said central aperture and said second portion having approximately the same angle of taper so as to provide a continuous outlet for the liquid in said storage vessel, the liquid flowing through said opening formed in said secondary portion and exiting at the second end of said central passageway remote from the first end connected to said second portion.

8. The cooking utensil according to claim 7, wherein said support means comprises a dome-shaped portion having an outwardly flaring circumferential lip at its bottom end thereof, and a downwardly extending circular bead extending from near the top of said dome-shaped portion, said top of said dome-shaped portion having a central opening formed therethrough for reception therein of said second end of said secondary portion, said second end of said secondary portion abutting against and seated upon the top surface of said circular bead, said central passageway of said means for supporting being defined by said circular bead.

9. The cooking utensil according to claim 8 in combination with a saucer upon which rests said support means, said saucer comprising a top surface and an upstanding circular rib projecting form said top surface defining therein a recess, said foot means depending from said second enlarged knob, said recess supporting therein the end of said foot means, whereby when said device is not being used to separate liquid, it may rest upon the saucer and said saucer serves to retain said flexible element at said junction.

10. The cooking utensil according to claim 9, wherein said saucer is of circular cross-section and has an outer diameter approximately equal to the outer diameter of said outwardly flaring circumferential lip, and the diameter of said circular upstanding rib is less than the diameter of said circular bead, the outer circumferential portion of said saucer arching upwardly whereby the device may rest thereon.

11. The cooking utensil according to claim 10, wherein said upwardly arched circumferential portion of said saucer is above the bottom surface thereof the same distance as the top of said circular, upstanding rib is above the bottom surface.

12. The cooking utensil according to claim 6, wherein said storage vessel and said support means are made of glass and integrally cast together.

13. The cooking utensil according to claim 6, wherein said storage vessel is made of glass, and said support means is made of hard plastic.

* * * * *